(12) United States Patent
Groll (10) Patent No.: US 8,133,026 B2
(45) Date of Patent: Mar. 13, 2012

(54) FIXED HORIZONTAL AXIS-MOUNTED WIND TURBINE BLADE WITH AN INDEPENDENTLY ROTATING PRESSURE CAMBERED FIN

(75) Inventor: Richard John Groll, Tyngsborough, MA (US)

(73) Assignee: Richard J. Groll, Tyngsboro, MA (US)

( * ) Notice: Subject to any disclaimer, the term of this patent is extended or adjusted under 35 U.S.C. 154(b) by 875 days.

(21) Appl. No.: 12/217,153

(22) Filed: Jul. 2, 2008

(65) Prior Publication Data
US 2010/0003137 A1 Jan. 7, 2010

(51) Int. Cl.
*B64C 11/00* (2006.01)
*B64C 11/12* (2006.01)
(52) U.S. Cl. ........................................ 416/131; 416/119
(58) Field of Classification Search .................. 416/131, 416/119, 175, 203, 211, 243, 1, 200 R, 136; 290/44, 55, 1 C; 415/4.1, 4.3, 4.5
See application file for complete search history.

(56) References Cited

U.S. PATENT DOCUMENTS

| | | | | |
|---|---|---|---|---|
| 5,518,367 A | * | 5/1996 | Verastegui | 416/119 |
| 2003/0143072 A1 | * | 7/2003 | Smith, II | 416/1 |
| 2004/0057830 A1 | * | 3/2004 | Boatner | 416/61 |

* cited by examiner

*Primary Examiner* — Thomas L Dickey
*Assistant Examiner* — Nikolay Yushin (57) ABSTRACT

A fixed horizontal axis-mounted wind turbine blade impelled by an independently rotating, pressure cambered fin includes a wind turbine blade comprised of a solid, rigid leading edge and trailing edges. The blade is triangular in shape, the base of the triangular blade is attached to a center, longitudinally fixed, horizontal, primary rotating axis and the point opposite the base is most distant from the horizontal rotating axis. The wind turbine blade base and length are aligned mutually perpendicular to the primary horizontal axis of rotation. A triangular fin is attached to the trailing edge of the blade end most distant from the base. The base of the attached fin is coincident to a secondary axis of rotation. The secondary axis of rotation allows the fin to rotate past either side of the plane of primary blade revolution in response to wind pressure.

3 Claims, 14 Drawing Sheets

FIXED HORIZONTAL AXIS-MOUNTED WIND TURBINE BLADE WITH AN INDEPENDENTLY ROTATING PRESSURE CAMBERED FIN

BACKGROUND OF THE INVENTION

The invention relates to a wind turbine impeller assembly.

Wind turbines are common devices which traditionally consist of a rotating axis driven by an attached blade which converts the raw energy of wind into directional work. Prior to the development of the rotating axis, the blunt force of the wind was harnessed to motivate watercraft through the use of a sail. The wind power industry has developed novel ways to harness wind power by using a blade or impeller, which is a modification of the sail, to cause rotation of an attached axis which is used to perform useful work or to store energy until it is needed. The wind industry has expanded to build everything from small mast-borne, propeller driven generators and alternators for ancillary electrical power on watercraft to gigantic, highly sophisticated turbines which can produce in excess of one megawatt of electricity.

The common denominator in commercially viable modern wind power is the use of the horizontal axis wind turbine which pitches (yaws) into the prevailing wind direction. The pitching mechanism depends on the ability of the horizontal axis of turbine rotation to be longitudinally aligned with the direction of the wind, maximizing the circumference, and thus the cross-section of moving air intercepted by the blades radiating from the central axis. This requires horizontal axis wind turbines to pitch into the wind by self-determinant means such as a vane on an agricultural water pump mill or a sophisticated sensor which activates steering gears on commercial turbines.

The most similar existing embodiment to this invention is named an airfoil assembly, U.S. Pat. No. 6,983,223, having fins which camber in response to air pressure in one direction and blades which camber in two directions. The description of the embodiment states that the invention is intended to begin operation at low wind speeds. The airfoil assembly is designed to yaw, or pitch into the wind with the blades either up-wind or down-wind of the center vertical pivot. The airfoil assembly does not appear to have the ability to rotate in the same direction consistently regardless of wind direction without the benefit of a vertical axis of revolution or human manipulation of the blade fins.

The fixed horizontal axis-mounted wind turbine blade with an independently rotating, pressure cambered fin differs from the airfoil assembly in that the blades maintain a fixed plane of revolution about the primary axis of rotation. The tips of the fins attached to the blades rotate freely to either side of the plane of blade revolution depending on which side is the wind-source side of blade revolution. The primary horizontal axis of rotation of this invention does not need to change direction at any time in order to function as claimed, however, the invention could be fitted on to a base with a central vertical pivot and directional vane to yaw (revolve) 180 degrees in the horizontal plane with incident wind direction. This would increase yield while still benefiting from the independently cambering fins, as the device would still rotate in the same direction regardless of which side of the plane of blade revolution was upwind.

SUMMARY OF THE INVENTION

The invention is a wind turbine blade and fin assembly, which, when a minimum of two identical wind turbine blade assemblies such as those described as this invention are equidistantly and equiradially fixed to a freely rotating horizontal central axis which is restrained from horizontal revolution, will cause rotation of the horizontal central axis in the same direction regardless of incident wind direction.

The wind turbine blade is attached to the central horizontal rotational axis as a radial arm which comprises both the radial wind turbine blade connected at its base to a laterally fixed, horizontal rotating axis and part of the freely rotating fin at its end. The radial blade arm is fixed to the central horizontal axis of rotation in a manner which causes it to revolve in unity with the rotation of the fixed central horizontal axis.

The freely rotating fin is comprised of a triangular frame which is attached with hinges to the trailing edge of the blade, the length of the freely rotating fin tip is quasi-perpendicular to the length of the blade to which it is attached. The second axis of rotation is parallel to the length of the trailing edge of the radial blade arm.

Blades can either be a group of at least three single blade/fin assemblies mounted at equal distances around a central hub which is fixed to the central horizontal axis of rotation or dual blades attached base to base, cut from a single element, mounted and fixed at the geometric center of the common element to the horizontal rotation axis. The fins of a dual blade configuration are attached on mutually opposite ends and mutually opposite sides of the dual blade. Two or more dual blade pairs can be mounted radially equidistant around the horizontal central rotation axis to create a multiple blade/fin turbine.

The fixed horizontal axis-mounted wind turbine blade with an independently rotating, pressure cambered fin is a means to eliminate the need for wind turbines to track wind direction. The space which the turbine can operate is reduced. The turbine is able to function consistently in both laminar and turbulent air flow. The invention allows the wind turbine to be securely fastened to the sides of structures in the urban environment, close to consumer demand. The simple design represents significant cost reduction over modern turbines and can be reproduced with common tools and materials.

The fixed turbine axis mounting allows for a single frame and shaft assembly to be constructed as a power take-off. The power take off is fixed, so pulleys, sprockets and gears can be mounted on the power take off shaft or the shaft can be directly coupled to reducing gear assemblies and crank-driven piston assemblies. Interchangeable power take-off devices can be independently mounted within the framework of the turbine support, opening a range of design possibilities for various applications.

The length of the blade arms and size and shape of the blade fins can be made interchangeable so modifications matching the environment to the application of interest can be made on a single platform.

DETAILED DESCRIPTION OF THE INVENTION

Figure 3:
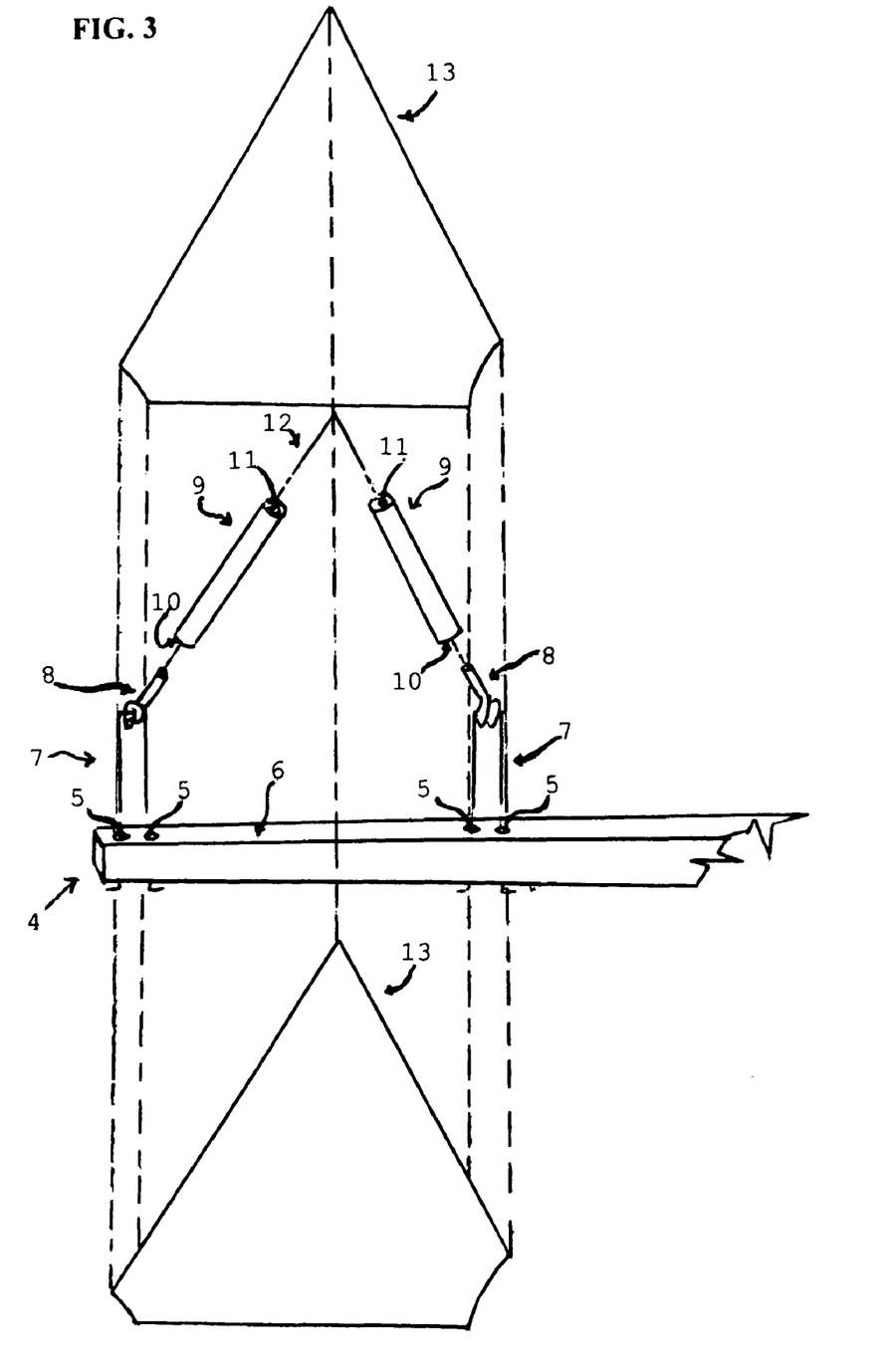
FIG. 3 is an expanded view of the blade/fin construction.
Figure 4A:
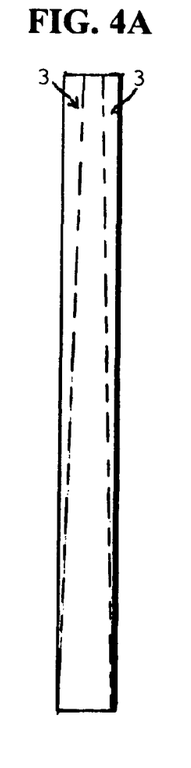
FIG. 4A is a single blade cut from raw stock.
Figure 4B:
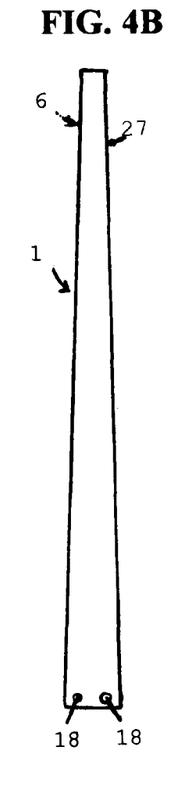
FIG. 4B is a single blade cut and fitted with hardware holes to attach to a center hub.
Figure 4C:
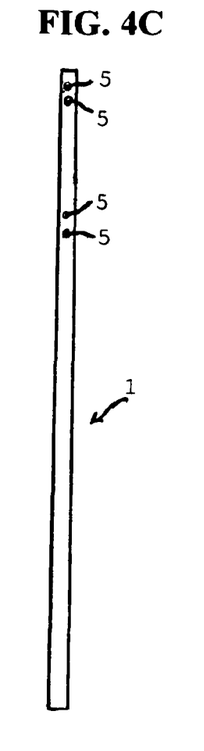
FIG. 4C is a single blade cut and fitted with hardware holes to attach the fin frame to the trailing edge of the blade.
Figure 6A:
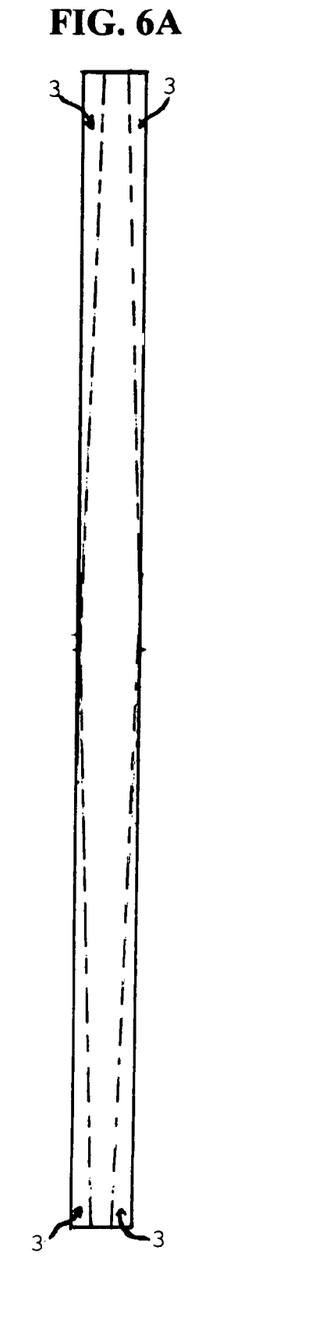
FIG. 6A is a dual blade cut from raw stock.
Figure 6B:
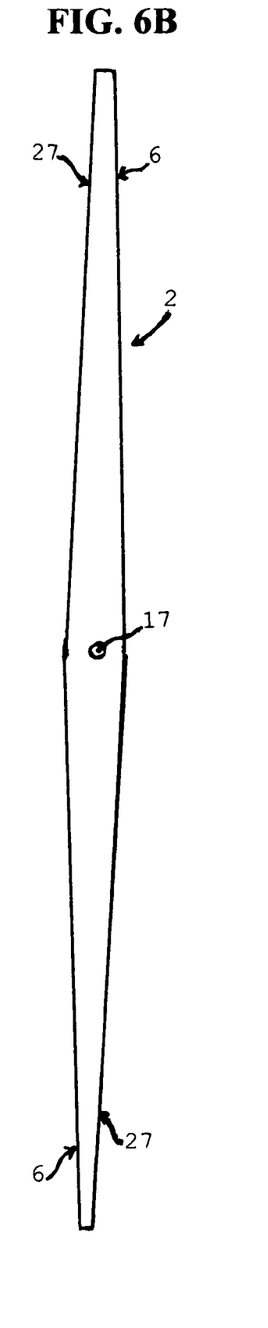
FIG. 6B is a dual blade cut and fitted with a center shaft hole.
Figure 6C:
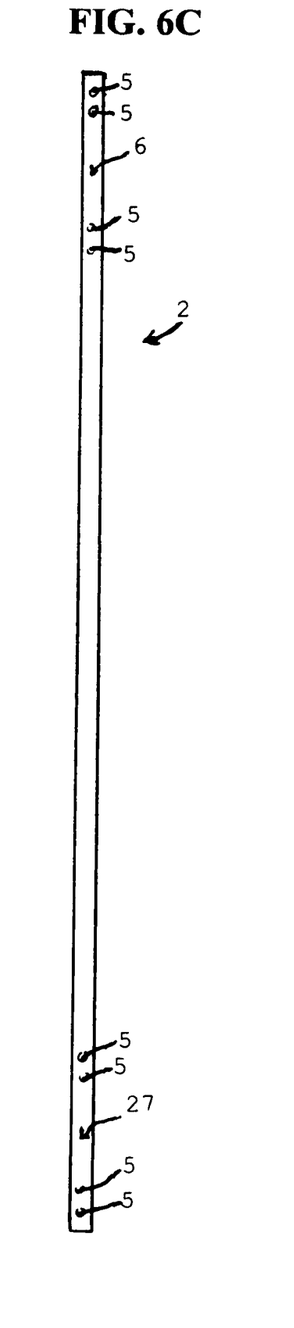
FIG. 6C is a dual blade cut and fitted with hardware holes to attach fin frames to the trailing edges of the dual blades.
Figure 7:
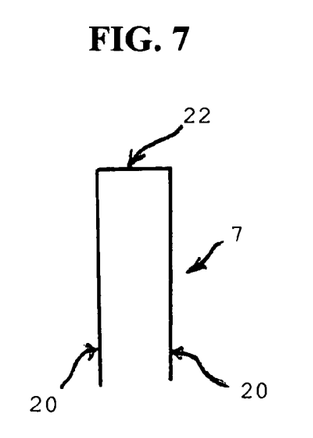
FIG. 7 is a staple which forms the attachment for a hinge loop to the trailing edge of the blade.
Figure 8A:
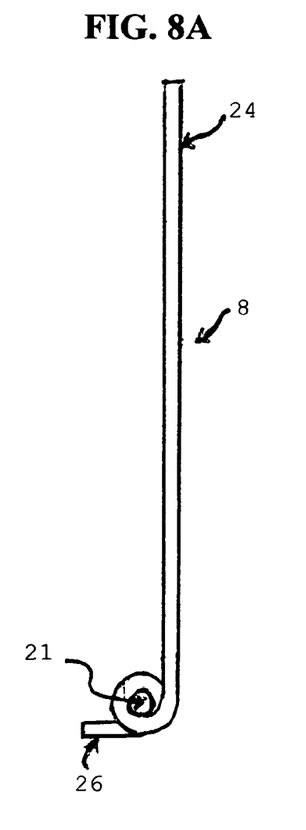
FIG. 8A is a view of a hinge loop of fin including loop for hinge to be held by staple and stub preventing rotation past preferred camber.
Figure 8B:
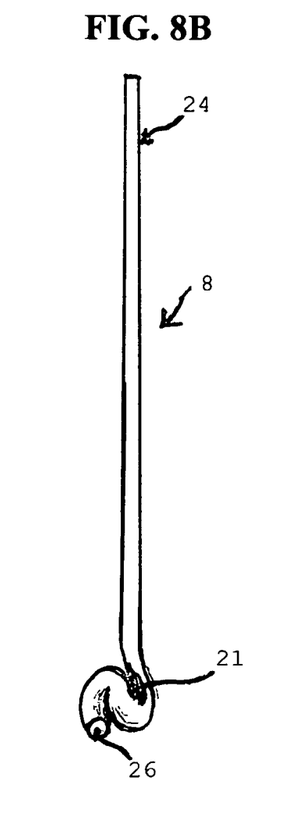
FIG. 8B is a view of a hinge loop with loop for hinge to be held by staple and stub preventing rotation past preferred camber oriented 90 degrees from FIG. 8A toward observer.
Figure 9:
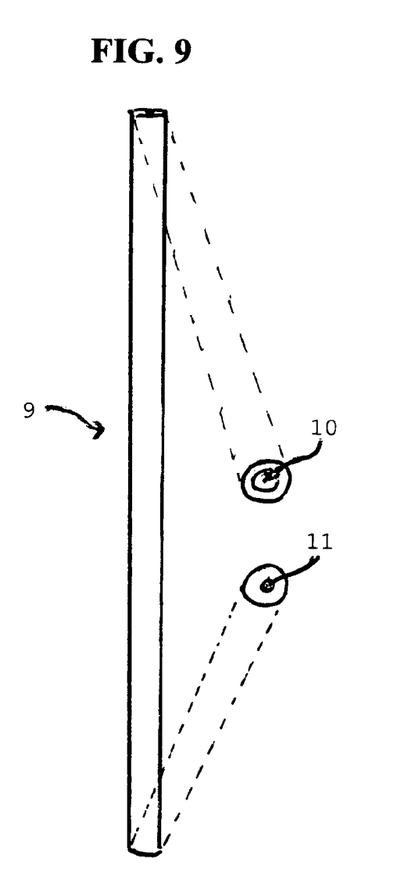
FIG. 9 is a view of a bamboo cane with projections demonstrating holes bored longitudinally through the ends of the cane to accommodate hinge wire and tip wire of fin.
Figure 10:
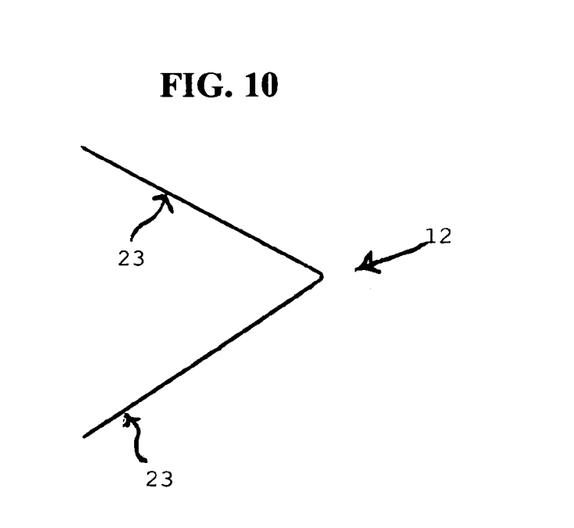
FIG. 10 is a tip wire used to bind together the ends of the two bamboo canes which comprise the sides of the triangular fin.
Figure 11:
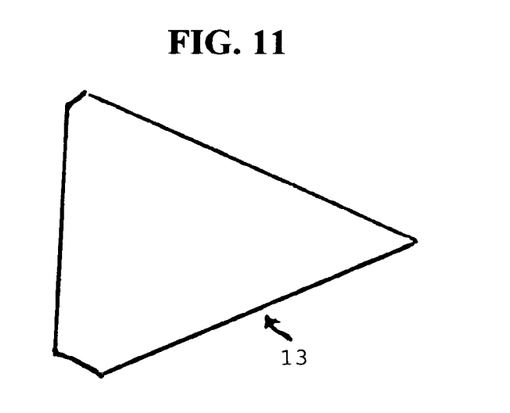
FIG. 11 is a single fin cover cut larger than the dimensions of the fin frame, which is sewn to an identical fin cover in the same shape as, but slightly larger than the fin frame to form a pocket in which the fin frame is sheathed.
Figure 12A:
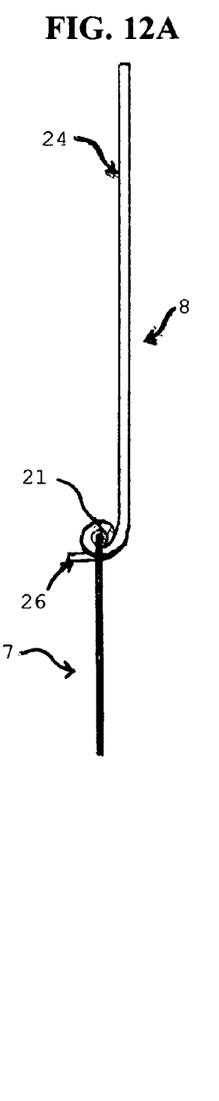
FIG. 12 is an assembled hinge which attaches the fin frame to the trailing edge of the blade, consisting of a staple and hinge loop.
Figure 12B:
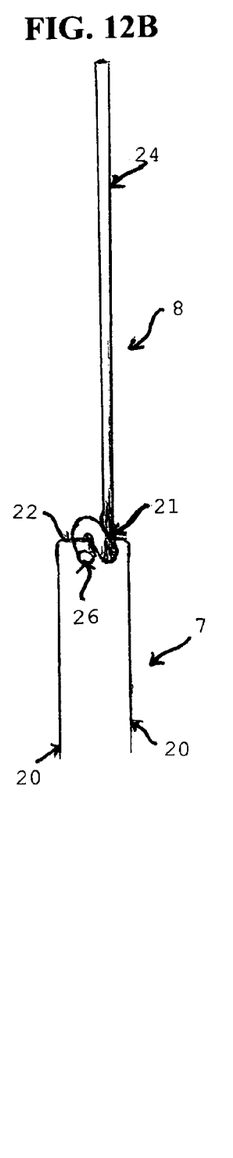
Figure 13:
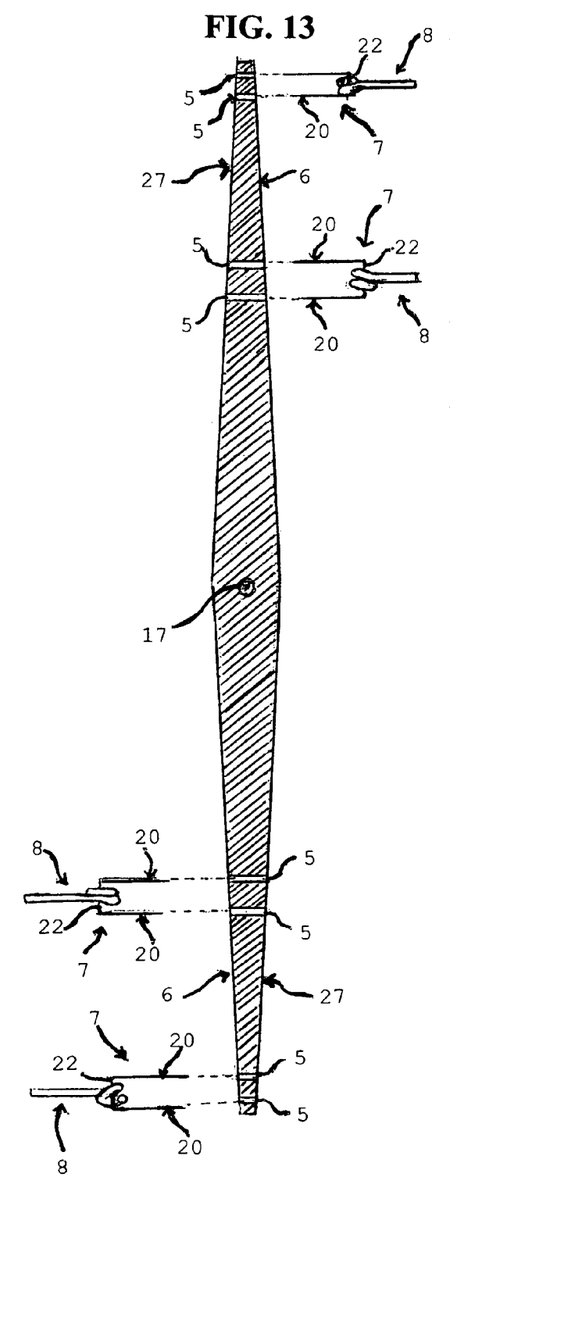
FIG. 13 is a dual blade/fin referencing relative position of holes bored into the blade stock and position of hinges prior to insertion into the accommodating holes in the trailing edge of the blade.

Each blade (1) or blade-pair (2) consists of a board with tapers cut in the sides (3) to form an elongate triangular blade (4) such as seen in FIG. 4A and FIG. 6A. Pairs of holes (5) are drilled into the tapered sides of the blades to accommodate hardware which will secure the frame of the fin (28) to the trailing edge of the blade (6) as seen in FIG. 17. The flexible fin frame components are seen in FIG. 7, FIG. 8, FIG. 9 and FIG. 10. The quantity of parts and order of assembly are demonstrated in FIG. 3 consisting of two staples (7), two rigid wire hinge loops (8), two bamboo canes (9) with longitudinally bored ends (10), (11), and one tip wire (12) to connect the ends of the two bamboo canes most distant from the trailing edge of the blade (6), best seen in FIG. 3 and FIG. 16.

Figure 14A:
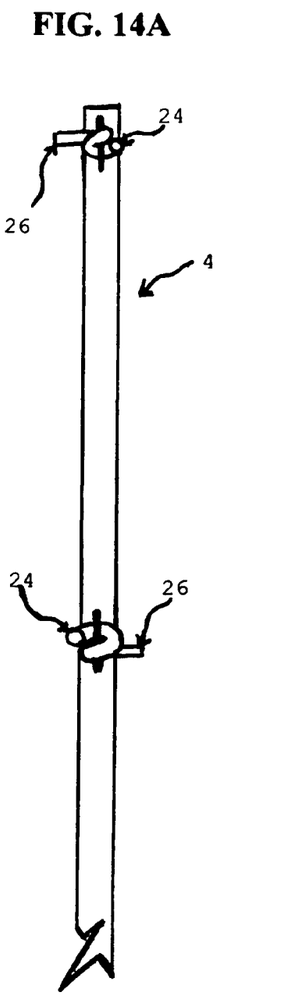
FIG. 14A is a plan view of the fin hinge wires and trailing edge of the blade; note the stubs projecting from the two hinge loops point in mutually opposed directions.
Figure 14B:
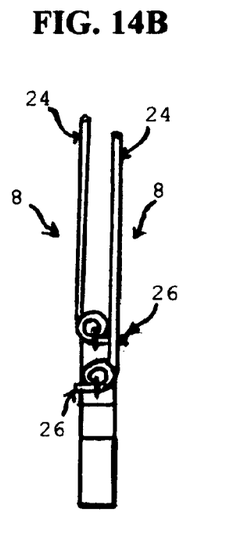
FIG. 14B is a blade-end view of the fin hinge staples inserted into the holes bored into the trailing edge of the blade; note the stubs projecting from the two hinge loops point in mutually opposed directions.
Figure 15:
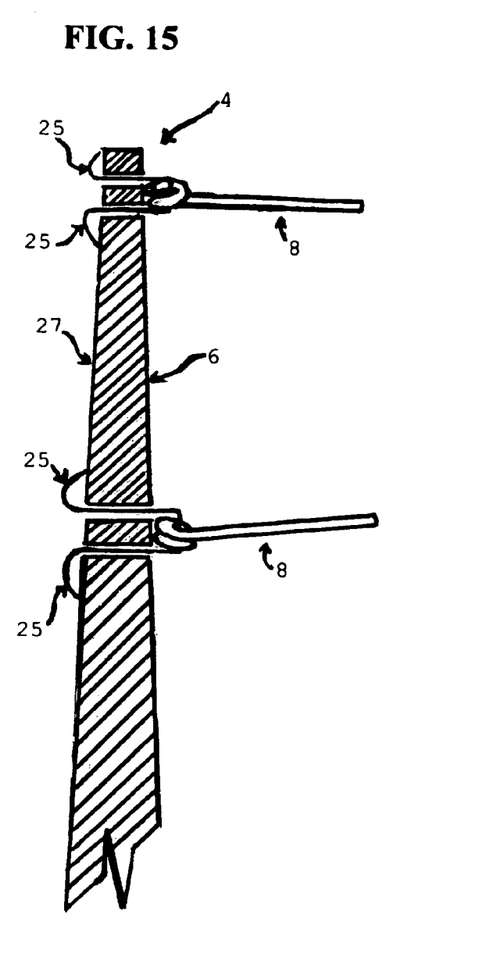
FIG. 15 is the installed position of the hinge staples in the blade-end.
Figure 16:
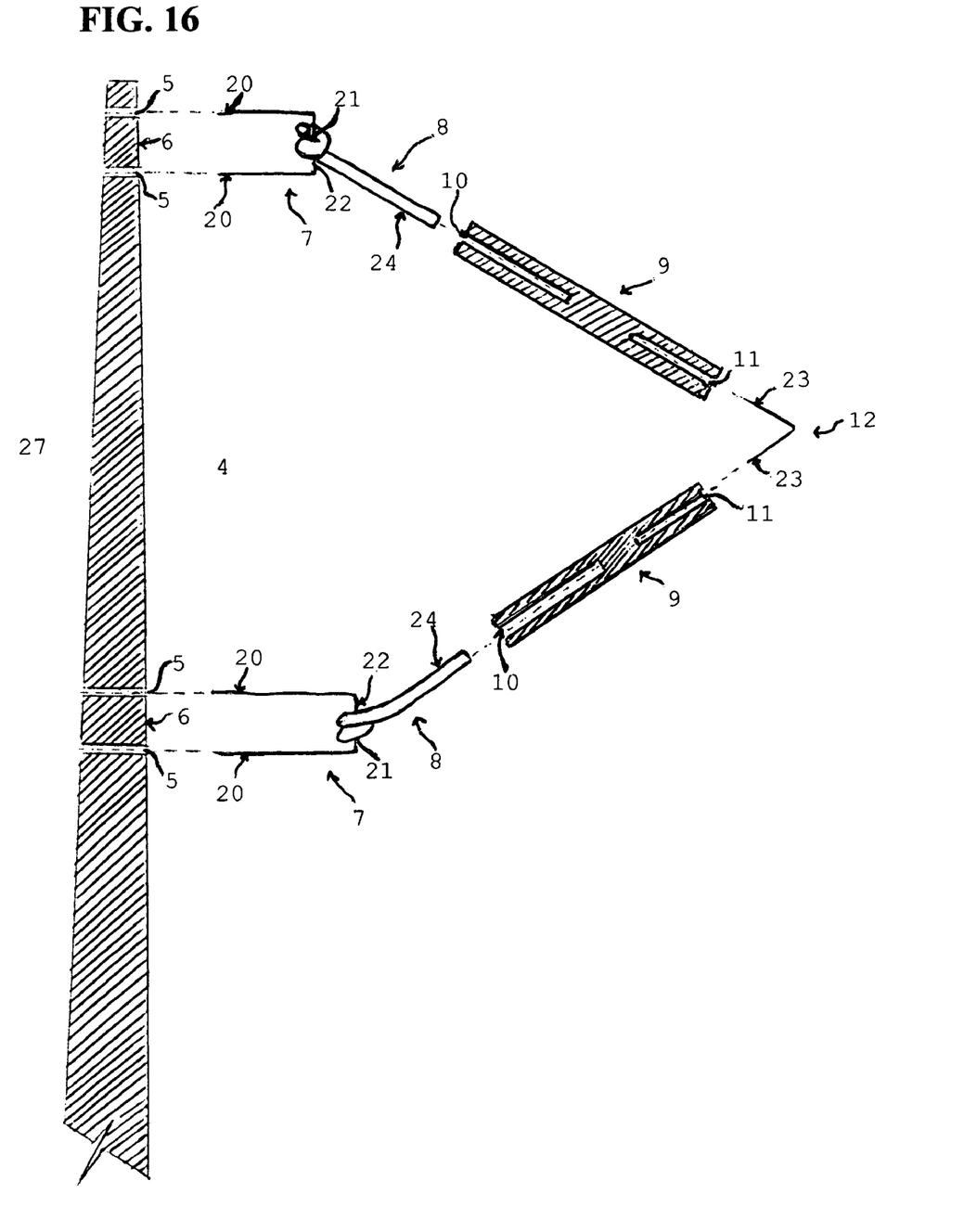
FIG. 16 is the expanded construction of the fin frame comprised of the blade, hinges, canes and tip wire.
Figure 17:
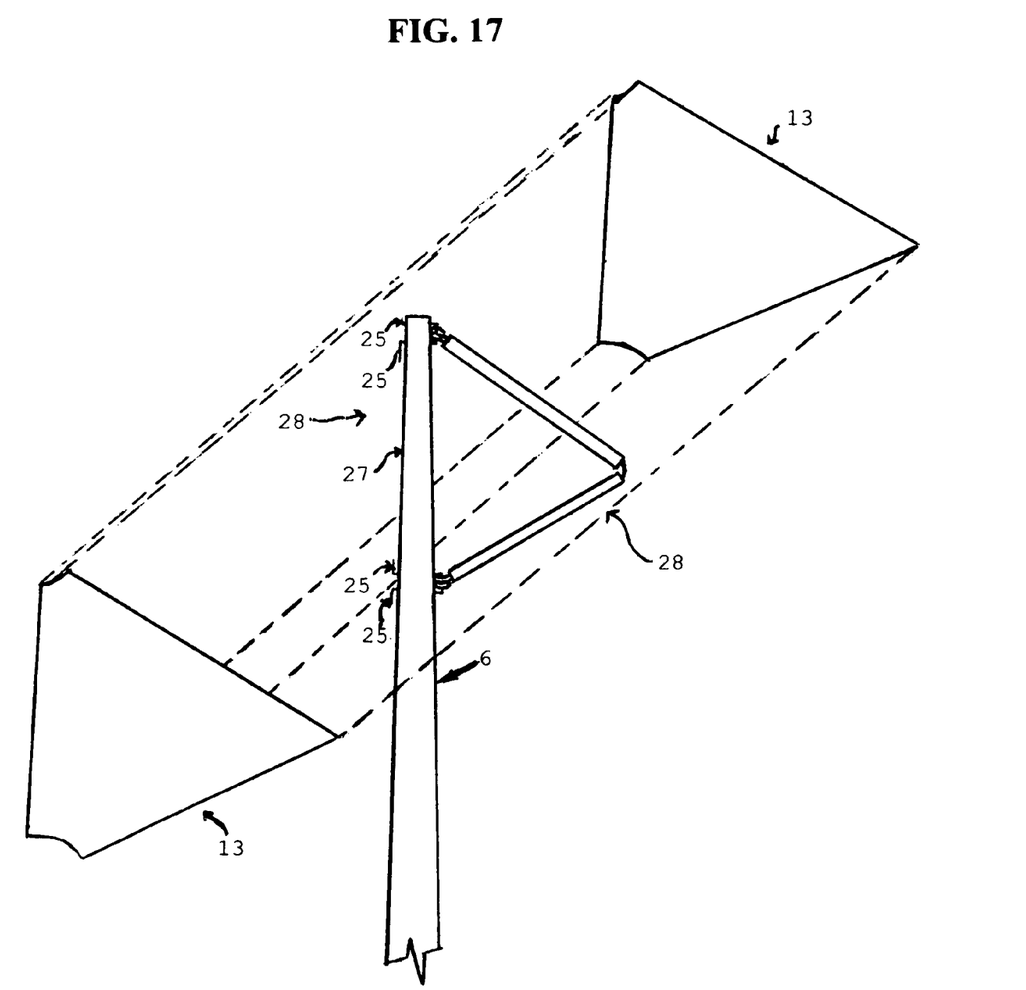
FIG. 17 is the two sides of the blade/fin sheath relative to the assembled blade/fin frame prior to application.
Figure 18A:
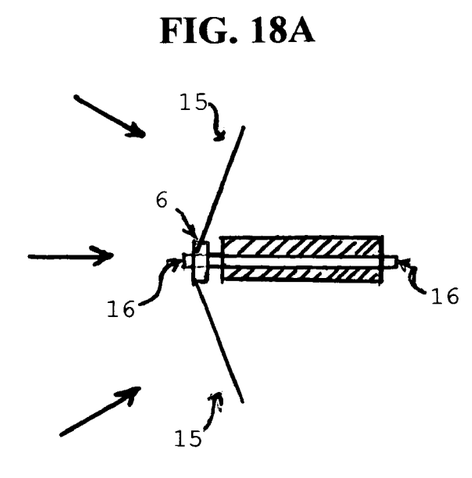
FIG. 18A is a plan view of the fins cambered toward the central-axis of rotation; wind direction(s) depicted with arrows.
Figure 18B:
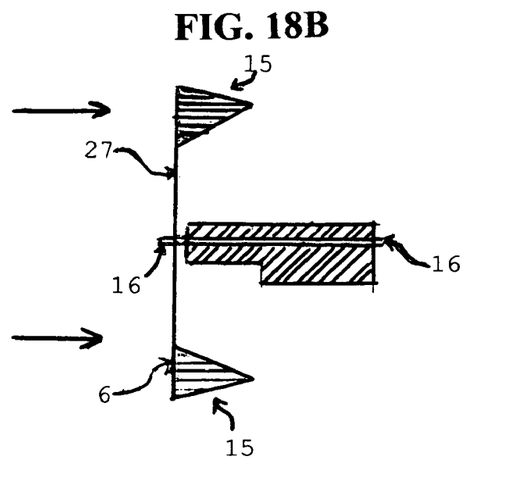
FIG. 18B is a profile view of the fins cambered toward the central axis of rotation; wind direction(s) depicted with arrows.
Figure 19A:
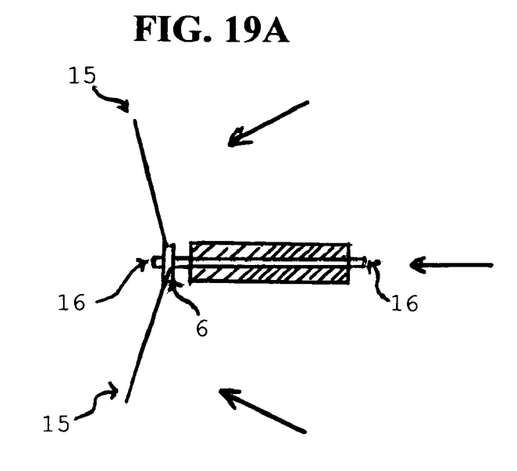
FIG. 19A is a plan view of the fins cambered away from the central axis of rotation; wind direction(s) depicted with arrows.
Figure 19B:
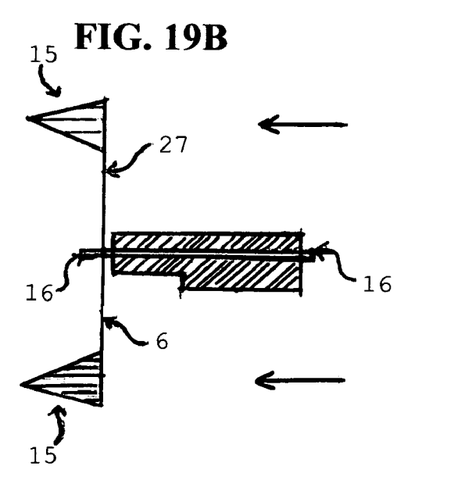
FIG. 19B is a profile view of the fins cambered away from the central axis of rotation; wind direction(s) depicted with arrows.

Referring to FIG. 16, the order of assembly begins with placing the ends (23) of the tip wire (12) into the smaller-bored ends (11) of the bamboo canes (9). The long ends of the rigid hinge loop wires (24) are then inserted into the larger bored ends (10) of the bamboo canes (9). One leg-end of a staple (20) is threaded through the loop (21) in the rigid hinge loop wire (8) until the center flat (22) of the staple is inside the hinge loop (21). The hinge is subsequently fastened into the trailing edge of the blade (6) by placing the ends of the staples (20) into the holes (5) bored through the trailing edge of the blade (6) to the leading edge of the blade (27). Referring to FIG. 14A and FIG. 14B, care must be taken that the stub-ends of the hinge loops (26) are projecting from the hinges in mutually opposing directions. Referring to FIG. 15, the ends of the staples (20) are inserted through the holes (5) until the portion of the hinge loop which is drawn toward the trailing edge of the blade is in loose contact with the trailing edge of the blade (6). The staple ends projecting past the plane of the leading edge of the blade (27) are bent to the leading edge of the blade in a manner that causes the two ends of each staple to point away from each other (25), but parallel to the length of the blade.

Figure 1A:
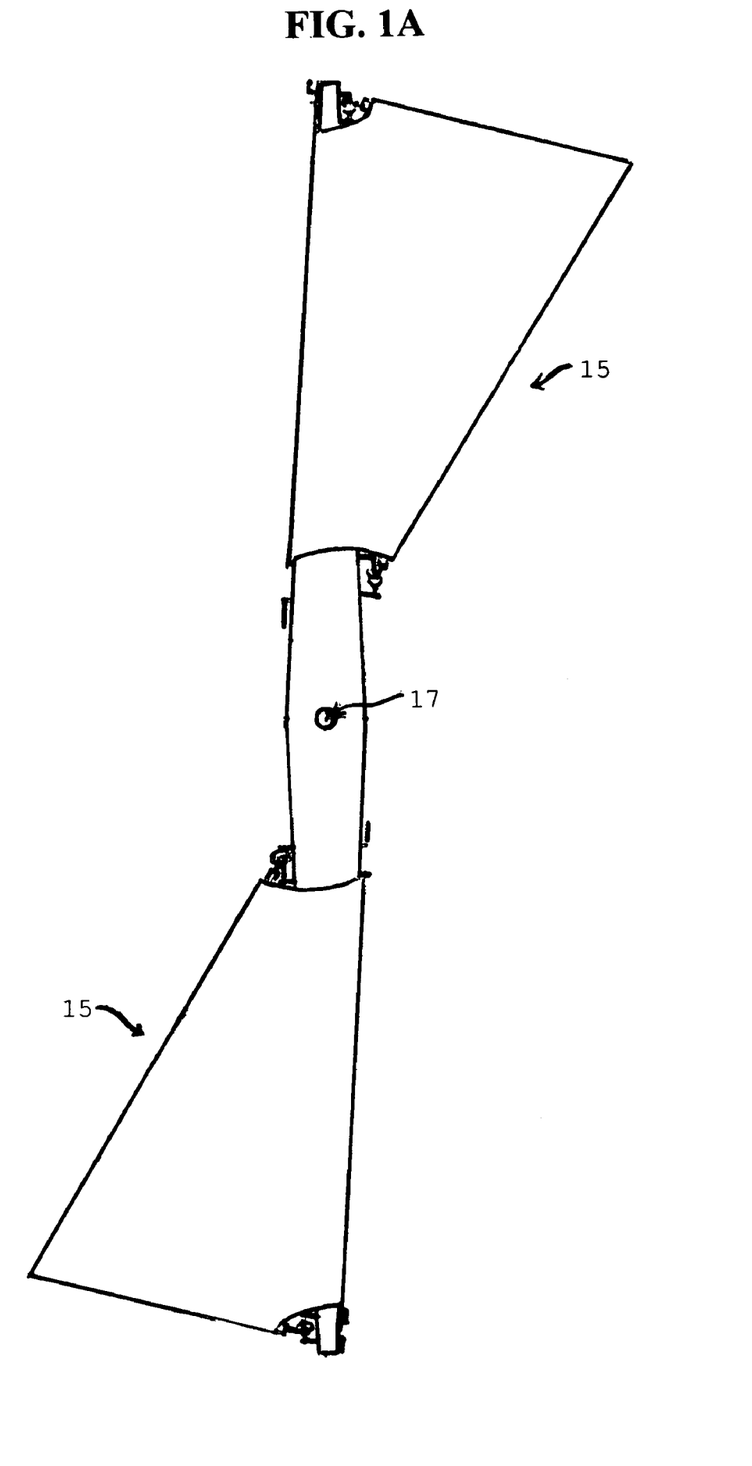
FIG. 1A is a two blade/fin configuration.
Figure 1B:
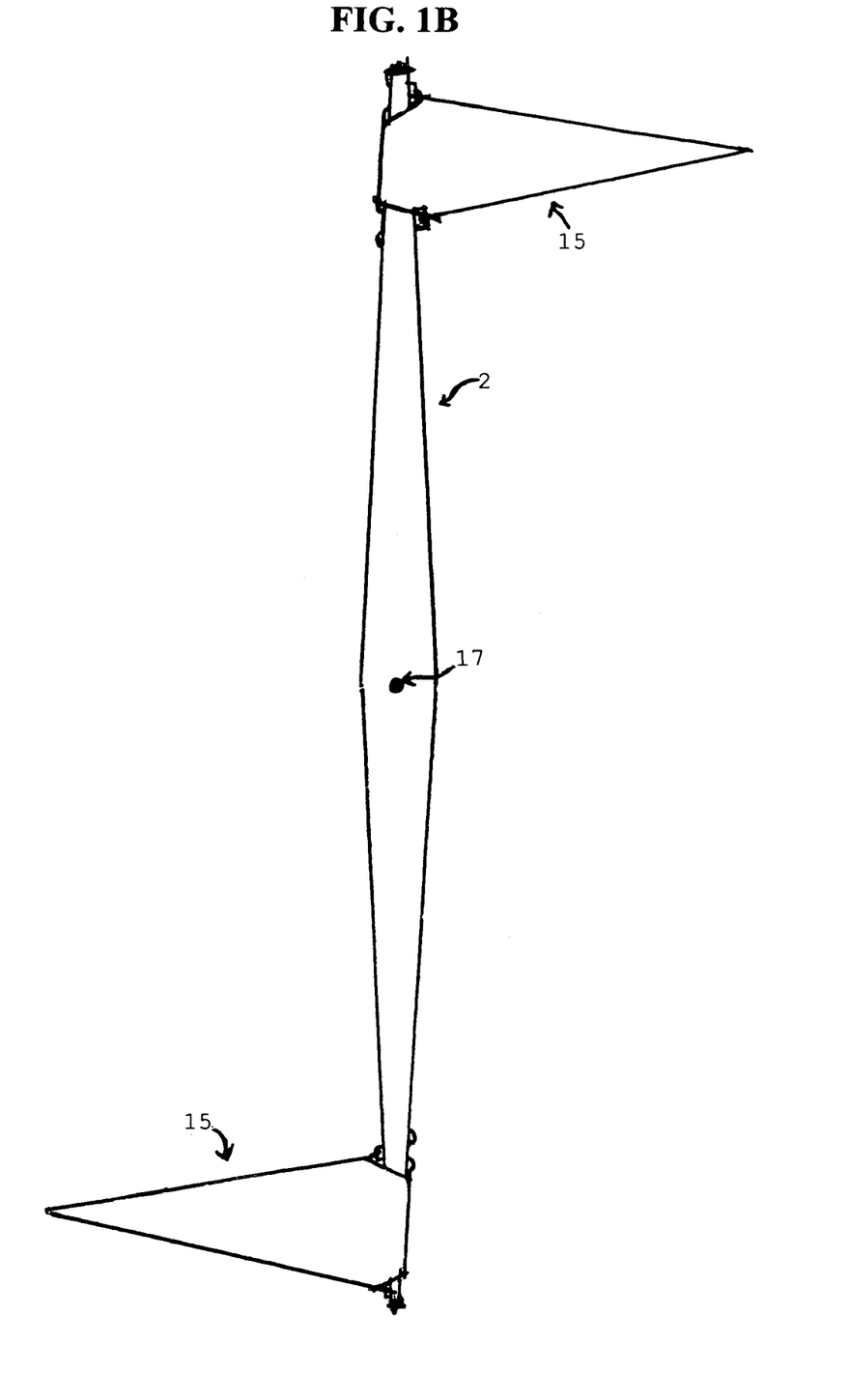
FIG. 1B is a two blade/fin configuration.
Figure 1C:
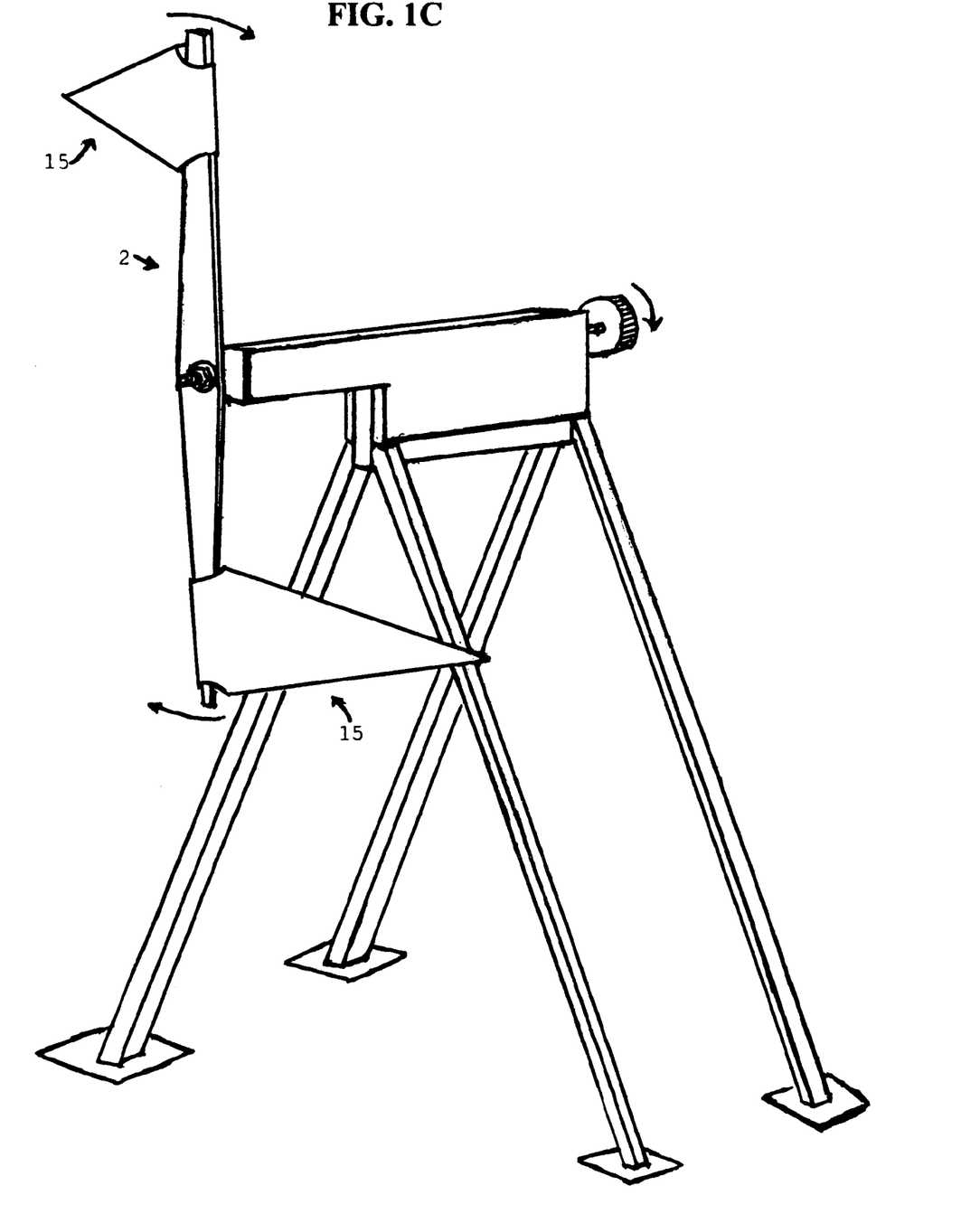
FIG. 1C is a two blade/fin configuration mounted to shaft and frame with arrows demonstrating direction of rotation.
Figure 2A:
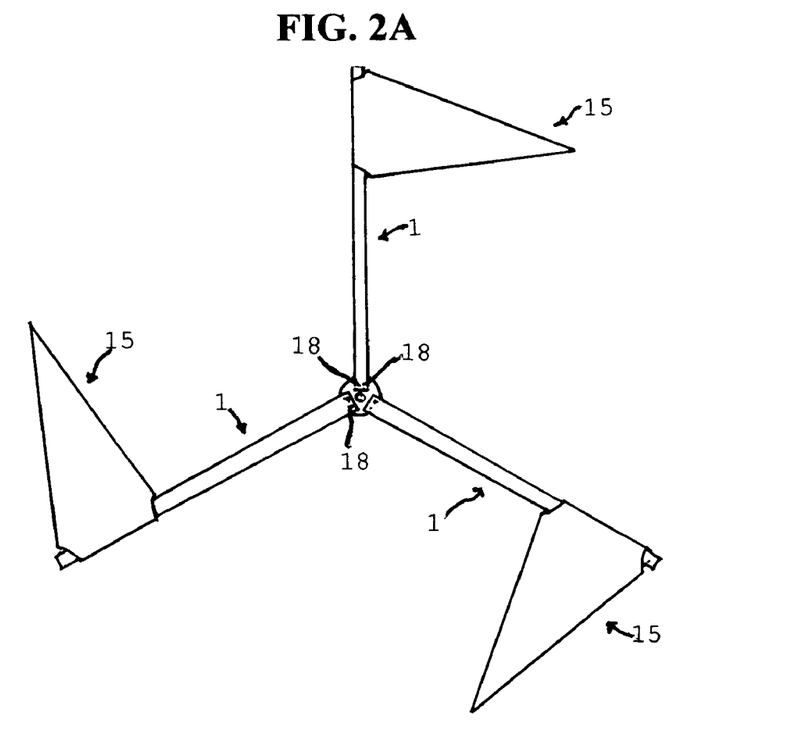
FIG. 2A is a three blade/fin configuration.
Figure 2B:
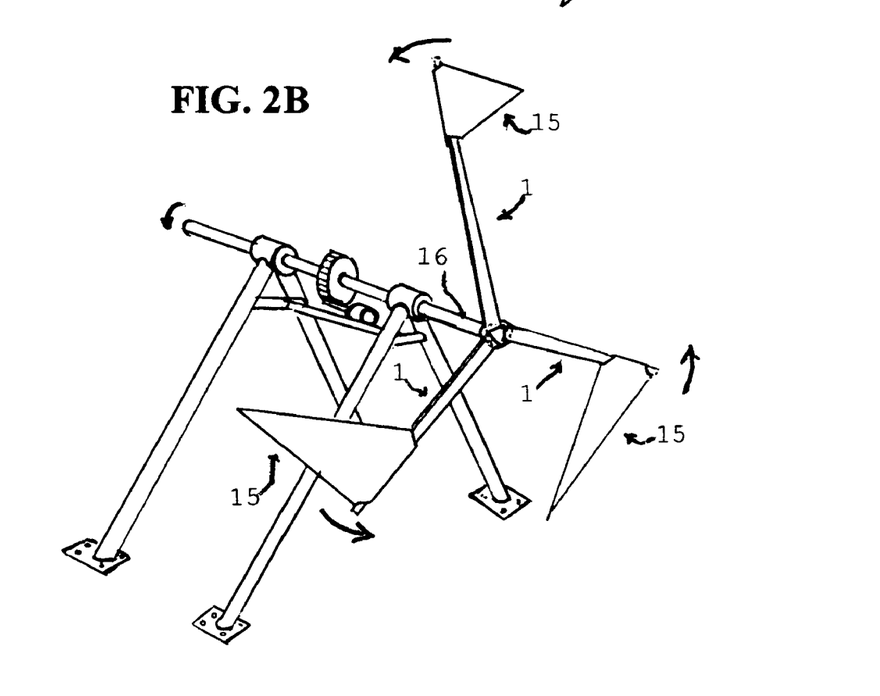
FIG. 2B is a three blade/fin configuration mounted to a shaft and frame with arrows demonstrating direction of rotation.

Referring to FIG. 3 and FIG. 17, the blade and fin frame are unified into a single planar feature with two identical pieces of cloth (13) to form item (15) seen in FIG. 1A, FIG. 1B, FIG. 1C, FIG. 2A and FIG. 2B. The cloth covers are the same shape as, but slightly larger than the outside dimensions of the blade/fin frame (28) as seen in FIG. 17. The two pieces of cloth are sewn into a sheath the same shape as the assembled blade/fin frame (28), and the blade/fin frame is inserted into the sheath so that it is covered by the cloth in its entirety (15). The interior space of the cloth covering does not fit tightly against the outer perimeter of the blade/fin frame, but is constructed slightly larger than the blade/fin frame to allow free rotation of the fin to either side of the plane of blade revolution. The blade/fin cover is subsequently sewn shut parallel to the leading edge of the blade, completing the enclosure of the blade/fin frame.

Figure 5A:
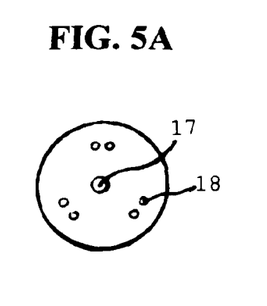
FIG. 5A is a hub used to join a single blade to the central horizontal axis of rotation.
Figure 5B:
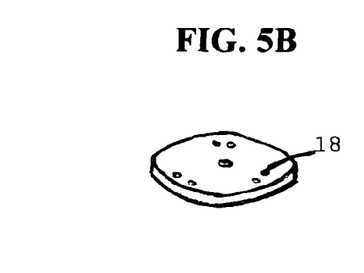
FIG. 5B is a hub used to join a single blade to the central horizontal axis of rotation.

Referring to FIG. 1A and FIG. 1B, the flexible fins (15) are affixed to mutually opposed sides of opposing ends of any dual blade (2) and only one fin can be affixed to one side of a single blade-end (1). A horizontal axis or shaft (16), such as seen in FIG. 1C and FIG. 2B is the receiver of the blades, carrying the blades through a single hole (17) drilled to the same diameter as the horizontal axis or shaft. The carrying hole is drilled into the geometric center of the broad dimension of a dual blade. The horizontal axis or shaft may also be inserted into a hole drilled into the geometric center of a circular hub composed of durable plastic or plywood such as that of FIG. 5 (17). The base of the single blade is attached center hub with a minimum of two fasteners (18). In any case, the plurality of blades fixed to the central hub are spaced mutually equidistantly and equiradially to each other. The blades are secured to the axis to unify revolution of the blades to the axis of rotation with a threaded compression fitting, wrist pin or a combination of both (19).

What is claimed:

1. A wind turbine blade assembly comprising a structure that includes a minimum of two radially and circumferentially equidistant fins of identical size, shape, weight and capacity of fin-tips to freely rotate past a plane of blade revolution in a manner that, when exposed to an air current from any direction will cause a horizontal primary central axis of rotation to which blades are attached to turn in the same direction consistently.

2. The wind turbine blade assembly of claim 1, wherein a triangular-shaped fin is attached to the a trailing edge of a blade-end by means of a pair of hinges which allow the a fin-tip to freely rotate in a partial circumference around the trailing edge of the blade-end to either side of the plane of blade revolution.

3. A single wind turbine blade assembly including a fin to react to incident air currents, hinges which cause the fin to remain fastened to the assembly but allow the fin to autonomously rotate in response to incident air current, a pair of stops which define the maximum degree of rotation of the fin on its hinges, and an arm which connects the fin to a horizontal drive shaft in a manner which causes the reactive motion of the fin to be proportionately transferred to the horizontal drive shaft.

* * * * *